July 3, 1923.
W. G. LYMAN
1,460,551
ICE CREAM DIPPER
Filed Dec. 15, 1921
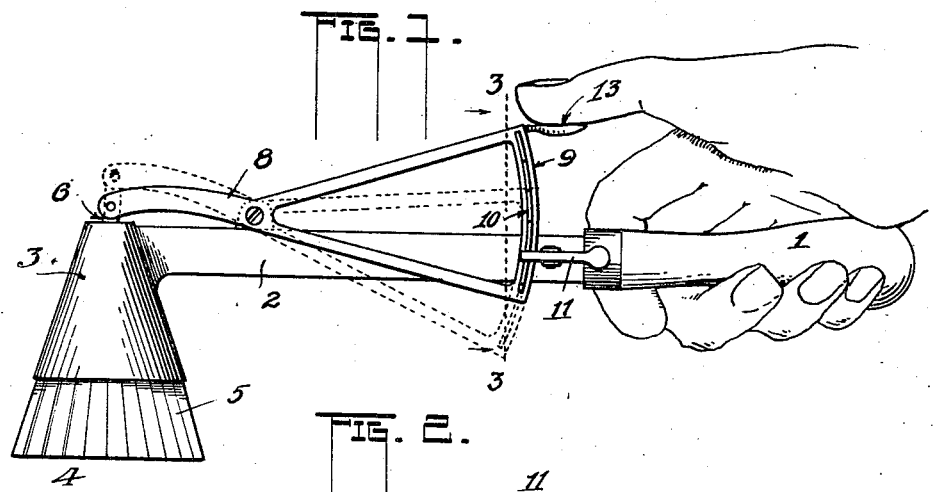
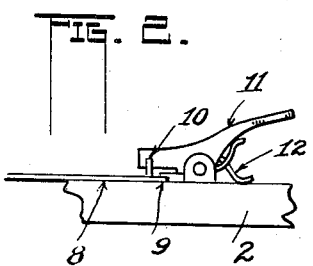
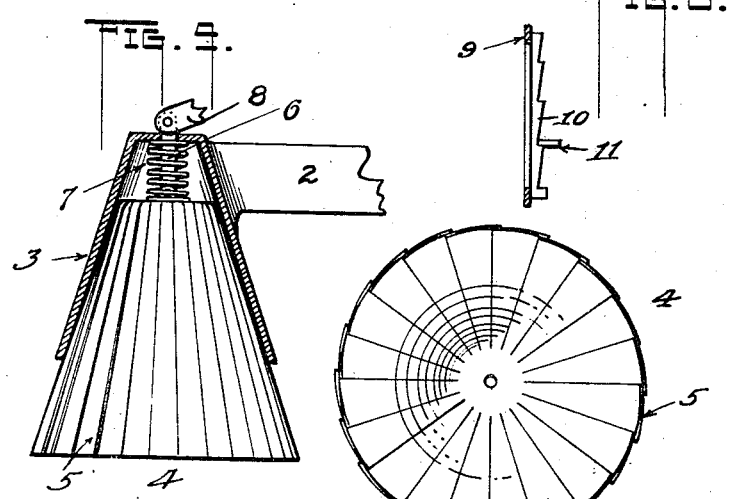
INVENTOR.
W. G. Lyman,
BY
L. M. Thurlow
ATTORNEY.

Patented July 3, 1923.

1,460,551

UNITED STATES PATENT OFFICE.

WILLIAM G. LYMAN, OF PEORIA, ILLINOIS.

ICE-CREAM DIPPER.

Application filed December 15, 1921. Serial No. 522,515.

*To all whom it may concern:*

Be it known that I, WILLIAM G. LYMAN, citizen of the United States, residing at Peoria, in the county of Peoria and State of Illinois, have invented new and useful Improvements in Ice-Cream Dippers; and I do hereby declare that the following is a full, clear, and exact description of the invention, which will enable others skilled in the art to which it appertains to make and use the same.

This invention relates to a dipper for vending ice cream and other articles sold in bulk.

The object of the invention is to construct a dipper of a form that can be changed in capacity at will and to include means by which to fix at any given capacity the container for the commodity to be dispensed.

Another object is that of providing a dipper for ice cream by which that commodity may be easily dislodged.

In dispensing such goods as ice cream, for example, for which the dipper is particularly adapted, it is desirable to be able to measure the amount to be sold. That is to say, a small bulk only is required for so called "ice cream sodas," and the like, whereas a slightly larger bulk is desired for dispensing "ice cream cones," and for ice cream sold in dish lots a still larger bulk is needed.

It is with this purpose in view that the dipper to be described is designed in addition to the exceedingly important point, also, of employing a construction by which the commodity can easily be discharged or dislodged from the dipper, especially necessary when vending ice cream, by expanding said dipper at the time of delivery of such commodity to overcome adhesion with an accompanying jar or jolt. But this will be better understood as the description proceeds.

In the drawing forming part of this application,

Figure 1 is a side elevation of my improved dipper.

Figure 2 is a detail of a latch mechanism as seen when rotating the dipper one quarter turn from the position shown in Figure 1.

Figure 3 is a transverse section of the latch mechanism on line 3—3 Figure 1.

Figure 4 is a longitudinal section of the head of the device showing the relation thereto of a cone shaped expansible container or dipping portion, all shown on a larger scale, and Figure 5 shows the said expandible ladle as it appears when expanded and when looking into it.

The dipper includes a handle portion made up of the grip 1 and shaft 2, the latter terminating at one end in a hollow head 3 taking the form in the present instance of a truncated cone, merely by choice, other forms being possible so long as the results to be attained herein are made possible.

An expandible container, cup or dipping portion is shown at 4. This is made by slitting radially a circular plate of very thin spring material, preferably of non-corrosive metal, whose portions 5 of a wedge form when formed up into a cone overlap one another as shown in Figure 5, making a closed cup-like container or dipper.

It is clear that this, when placed in the head 3 and moved inwardly and outwardly, will contract and expand in proportion to the extent of movement imparted to it and therefore will be of greater or less capacity.

Centrally of the cup-like container at its small end from which extend the described portions composing its walls, is attached in suitable manner one end of a stem 6 whose other end extends through the closed small end of the head 3, Figure 4, a spring 7 being interposed between the head and the container, encircling said stem.

Pivoted upon the shaft 2 is a lever 8, one end of which is pivotally connected with the free end of said stem. The opposite end of the lever is provided with a sector 9 upon which are ratchet teeth 10.

Mounted on the shaft 2 adjacent the handle 1 is a thumb latch 11 which by means of any suitable spring 12 is held yieldingly in engagement with the sector or quadrant so that it may be lodged behind any desired tooth.

In use the lever which may be provided with a finger piece 13, if desired, may be moved on its pivot by pressure thereon of the finger or thumb, when the parts are in the position shown in Figure 1, thereby drawing the container into the head 3 to reduce its diameter, this change being shown in broken lines in the figure last referred to.

The latch 11 in this action rides over the teeth 10 and lodges behind any one tooth corresponding with the desired position of the said container holding the lever in the position placed.

Having dipped up the ice cream, or other commodity, it may be delivered from the container by inverting the dipper as shown in Figure 1, whereupon by lifting the latch 11 the lever will be returned to the position shown in full lines with a jerk, due to the spring 7. This action moves the container 4 suddenly outward which at the same time expands. This together with the resulting sudden jar as the lever strikes the head 3 dislodges the article being vended.

This operation is particularly of value when ice cream is the vended commodity which must usually be separated from the dipper by a knife or scraper. Again, metal of the container 4 is quite thin, and due to the fact that the surrounding air is comparatively warm, the metal does not tend to hold the cream as would a dipper of heavy metal.

The adjustment of the lever and the consequent change in capacity of the container 4 admit of vending a smaller or larger quantity of cream to suit the particular sale being made.

Evidently the spring 7 need not be placed where shown, but may be used outside the head 3 at any desired place and still perform the same office.

Again, the head 3 may be of any other form, and the container 4 may be altered in form. For example, the latter may have outwardly rounded walls in order to impart a dome shape to the cream instead of conical as in the form shown, but this, of course, is all within the meaning of my invention.

And as a matter of fact the device may be changed in various ways while still performing the services required of it.

I claim:—

1. The combination with a dipper of the type named including a handle and a head having an open cavity whose walls are outwardly flared toward its mouth, of an expansible cup having walls composed of overlapping parts adapted to move with respect to one another as the cup is moved inwardly and outwardly in contact with the walls of the cavity, and means mounted on the dipper attached to the cup for imparting movement thereto.

2. A dipper of the type named including with its handle a head having a cavity whose walls are outwardly flared, a cup substantially fitting said cavity including therewith a series of portions forming its walls adapted to contract and expand, and means mounted on the handle attached to the cup for moving the same within the cavity.

3. A dipper of the type named including with its handle a head having a substantially conical cavity, a cup of flexible material seated in the cavity, its walls including a series of portions adapted to move with respect to one another the same having overlapping edges, and means attached to the cup adapted to move it with respect to the head.

4. A dipper of the type named including with its handle a head having a cavity of substantially conical form, a cup seated in the cavity, the walls of said cup being made up of overlapping portions adapted to move upon and with respect to one another in a lateral direction, means connected to the cup adapted to move it with respect to the head and in conjunction with the latter adapted to contract and expand, and means to secure the cup in a desired position with respect to said head.

5. A dipper of the type named including with its handle a head having a cavity substantially conical in form, a cup seated in the cavity, the walls of said cup being made up of overlapping portions adapted to move upon and with respect to one another in a lateral direction, and a lever pivoted on the handle portion operatively connected to the cup adapted to move it longitudinally within and with respect to the head.

6. A dipper of the type named including with its handle a head having a cavity of substantially conical form, a cup adapted to seat in said cavity said cup including walls composed of overlapping portions adapted to move laterally upon and with respect to one another said walls adapted to expand and contract as the cup is moved with respect to said head.

7. A dipper of the type named including with its handle a head of hollow form, a cup seated therein having a substantially conical form adapted to contract and expand and whose walls are made up of overlapping portions adapted to move upon and with respect to one another in a lateral direction, and means operatively engaging the cup adapted to impart movement thereto with respect to the head in a longitudinal direction.

8. A dipper of the type named including with its handle a head having an open cavity, an expandible cup seated in the cavity and adapted to extend from said open end, a lever fulcrumed on the handle, attached to, and adapted to impart movement to said cup longitudinally of the head.

9. A dipper of the type named including with its handle a head having an open cavity, an expandible cup seated in the cavity and adapted to extend from said open end, means to impart movement to the cup to extend it from the head or to retract it, and means to fix the cup in a desired position with respect to said head.

10. A dipper of the type named including with its handle a hollow head open at one end, a cup lying within the head adapted to expand and contract, a lever fulcrumed on the handle operatively engaging the cup at one end, and means to secure the lever in a desired adjustment.

11. A dipper of the type named including with its handle a hollow head open at one end, a cup lying within the head adapted to expand and contract, a lever fulcrumed on the handle operatively engaging the cup at one end, a series of teeth on said lever and a latch to engage said teeth.

12. A dipper of the type named including with its handle a hollow head open at one end, a cup lying within the head adapted to expand and contract, a lever fulcrumed on the handle operatively engaging the cup at one end, and a spring in control of the lever.

13. A dipper of the type named including with its handle a hollow head open at one end, a cup lying within the head adapted to expand and contract, a lever fulcrumed on the handle operatively engaging the cup at one end, means to secure the lever in a desired adjustment, and a spring in control of the lever.

14. In a dipper of the type named, a dipping cup having walls adapted to expand and contract, a handle portion including a head having a cavity to receive the said cup, a lever operatively engaging the cup for imparting movement thereto, means to secure the lever in any one of several positions, and a spring to move the cup outwardly within the head upon release of said lever.

15. In a dipper of the type named, a dipping cup having walls adapted to expand and contract, a handle-portion including a head having a conical cavity to receive the cup, the latter adapted to expand and contract as it moves in contact with the walls of the cavity, a lever fulcrumed on the handle, a portion connecting the lever with the cup within the head, a spring adapted to move the cup outwardly, and means on the handle to station the lever at a desired position against the tension of the spring and for releasing the same.

In testimony whereof I affix my signature in presence of two witnesses.

WILLIAM G. LYMAN.

Witnesses:
JUDSON STARR,
L. M. THURLOW.